United States Patent
Gawron et al.

[11] Patent Number: 5,444,989
[45] Date of Patent: Aug. 29, 1995

[54] COLD-STORAGE CARTRIDGE

[75] Inventors: Klaus Gawron, Aachen, Germany; Reinhard Prandl, Ferlach, Austria

[73] Assignee: U.S. Philips Corporation, New York, N.Y.

[21] Appl. No.: 243,896

[22] Filed: May 17, 1994

[30] Foreign Application Priority Data

May 25, 1993 [DE] Germany .......................... 43 17 341.1

[51] Int. Cl.⁶ ............................................... F25D 3/00
[52] U.S. Cl. ........................................ 62/129; 62/457.2; 62/530
[58] Field of Search ............... 62/125, 129, 130, 457.2, 62/372, 437, 430, 436, 438, 530, 529; 165/11.1, 10, 10 A, 902; 116/216

[56] References Cited

U.S. PATENT DOCUMENTS

| | | | |
|---|---|---|---|
| 2,642,480 | 6/1953 | Shave | 62/129 X |
| 2,809,116 | 10/1957 | Laskowski | 62/130 X |
| 4,846,095 | 7/1989 | Emslander | 116/216 X |

FOREIGN PATENT DOCUMENTS

| | | | |
|---|---|---|---|
| 0324854 | 7/1989 | European Pat. Off. | |
| 7911326 | 11/1980 | France | |
| 1551368 | 7/1970 | Germany | |
| 2235969 | 3/1991 | United Kingdom | 62/125 |

*Primary Examiner*—Harry B. Tanner
*Attorney, Agent, or Firm*—Ernestine C. Bartlett

[57] ABSTRACT

The invention relates to a cold-storage cartridge comprising a housing (1,2) having an interior into which a cold-storage medium (4) is introduced and having a device for indicating the charging state of the cold-storage medium. A very simple arrangement for the indication of the fully charged state is obtained in that the indicator device comprises an indicator substance (13) whose melting temperature Ti is lower than the melting temperature Ts of the cold-storage medium (4), in that the indicator substance (13) is held in a container (10) which is in heat-conducting contact with the cold-storage medium (4), in that the container (10) comprises an optically transparent wall portion (8) and in that the indicator device is connected to the cold-storage cartridge in such a manner that the transparent wall portion (8) is visible from outside the cold-storage cartridge.

33 Claims, 1 Drawing Sheet

COLD-STORAGE CARTRIDGE

BACKGROUND OF THE INVENTION

The invention relates to a cold-storage cartridge comprising a housing having an interior into which a cold-storage medium is introduced and having a device for indicating the charging state of the cold-storage medium.

In an arrangement of this type which is disclosed in DE-A 1 551 368, the charging state of the cold-storage medium can be monitored by means of a temperature indicator. When the cold-storage medium has fallen below its melting temperature or crystallization temperature, its cold-storage capacity is exhausted and the charging process completed.

SUMMARY OF THE INVENTION

An object of the invention to provide a simpler arrangement for indicating the fully charged condition.

This object is achieved with an indicator device which comprises an indicator substance whose melting temperature Ti is lower than the melting temperature Ts of the cold-storage medium, wherein the indicator substance is held in a container which is in heat-conducting contact with the cold-storage medium, in that the container comprises an optically transparent wall portion and the indicator device is connected to the cold-storage cartridge in such a manner that the transparent wall portion is visible from outside the cold-storage cartridge.

In accordance with the the fully-charged condition of the cold-storage medium can be recognized by the crystallized state of the indicator substance. Since the crystallization temperature of the indicator substance is lower than the crystallization temperature of the cold-storage medium, the crystallization of the indicator substance implies that the cold-storage medium has surely crystallized completely and hence is fully charged. The crystallization of the indicator substance can be optically recognized by a change in color.

An indicator device in accordance with the invention is of a very simple construction. For the user, a simple "yes-no-indication" is easier to read than a temperature indication.

The recognizability of the crystallized state of the indicator substance is improved by introducing conspicuously colored solid bodies into the container whose specific weight differs from that of the liquefied indicator substance. If the solid bodies do not move when the cold-storage cartridge is moved up and down, then the crystallization is complete.

The difference in melting temperature between the cold-storage medium and the indicator substance should be small, so that it is not necessary to wait until the temperature has reached an unnecessarily high value. To this end, the melting temperature Ti of the indicator substance is preferably 1 to 5K lower than the melting temperature Ts of the cold-storage medium.

The difference in melting temperature can be selected to be very small when the container of the indicator device projects into the area of the cold-storage medium which is the last to crystallize during the cold-storage process.

If the indicator substance is a eutectic aqueous mixture of an inorganic salt, a substantially transition-free crystallization temperature is obtained, so that it is not necessary to postpone the determination of the completion of the charging process until the temperature has fallen below a broad crystallization-temperature range of a non-eutectic solution.

In a preferred embodiment of the invention is characterized in that the cold-storage medium is a mixture of potassium chloride, glycerine and water having a melting point of approximately $-12°$ C., and the indicator substance is a solution of 36.8% potassium hydrogenphosphate ($K_2HPO_4$) in water.

To allow an inevitable change in volume of the indicator substance to take place during its crystallization, the container is made from a synthetic resin which is elastically expandable at the operating temperature.

Preferably, a protective housing accommodates the container so as to be in heat-conducting contact therewith, and said protective housing projects into the cold-storage medium via an aperture in the bottom of the cold-storage cartridge.

Examples of aqueous solutions of indicator substances crystallizing at different temperatures are:

| | | |
|---|---|---|
| 1. | potassium hydrogenphosphate $K_2HPO_4$ melting point: $-13.5°$ C. | 36.8% solution |
| 2. | ammonium hydrogenfluoride $(NH_4)HF_2$ melting point: $-14.8°$ C. | 23.6% solution |
| 3. | ammonium chloride $NH_4Cl$ melting point: $-16.0°$ C. | 19.5 solution |
| 4. | sodium acetate $CH_3COONa$ melting point: $-18°$ C. | 23.3% solution |

The crystallization of these eutectic substances can be clearly recognized by a change in color. The change in volume of these substances ranges from 3 to 7% and the expansion of a container which is made from a suitable material varies proportionally.

Use can also suitably be made of an aqueous 19.5% potassium-chloride solution whose melting temperature can be adjusted in a range from $-12.4°$ C. to $14.1°$ C. due to the addition of glycerine in a quantity ranging from 5 to 10% by volume.

In general, indicator substances which can suitably be used are those which are compatible with the material of the container, which exhibit a clearly recognizable change in color and a small change in volume after crystallization, and whose susceptibility to over-cooling prior to crystallization is as small as possible.

BRIEF DESCRIPTION OF THE INVENTION

The invention will be explained in greater detail by means of exemplary embodiments and with reference to the accompanying drawings, in which FIG. 1 is a partial cross-sectional view of a first embodiment in accordance with the invention, FIG. 2 is a cross-sectional view of a variant of an indicator device of the invention into which solid bodies are introduced, FIG. 3 shows the indicator device in accordance with FIG. 2 after it has been rotated through 180°.

DETAILED DESCRIPTION OF PREFERRED EMBODIMENTS

Figure 1:
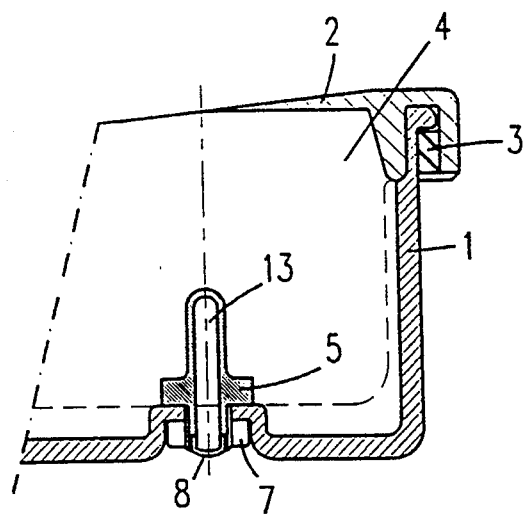

The housing of the cold-storage cartridge shown in FIG. 1 comprises a trough-shaped bottom portion 1 and a cover 2 which is secured to said trough-shaped bottom portion 1 in a hermetically sealed manner by a seal 3. A cold-storage medium 4, a mixture of potassium chloride, glycerine and water, having a melting point of approximately −12° C., is introduced into the interior of the housing.

An indicator device projects through an aperture in the wall of the trough-shaped bottom portion 1 and is secured to the wall of the bottom portion in a liquid-tight manner by means of a ring nut 7. A container 5 is made of polyethylene which is temperature-resistant and sufficiently elastic also at low temperatures. Said container 5 is filled with a solution of 36.8% potassium hydrogenphosphate in water. A transparent end wall 8 of the container 5 enables the crystallizated state of the indicator substance 13 to be optically determined from the outside.

An aperture through which the indicator device is introduced into a wall of the cold-storage cartridge can advantageously be used as a filling hole for the cold-storage medium.

Figure 2:
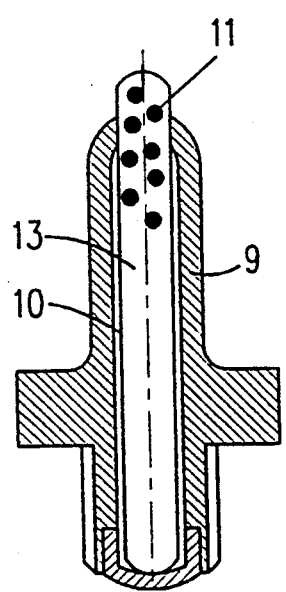

The alternative embodiment of an indicator device according to the invention, as shown in FIG. 2, comprises a protective housing 9 which surrounds a thin-walled container 10 which is filled with indicator substance 13. The mounting of the indicator device into a bottom wall of a cold-storage cartridge is carried out in the same manner as described in FIG. 1.

Figure 3:
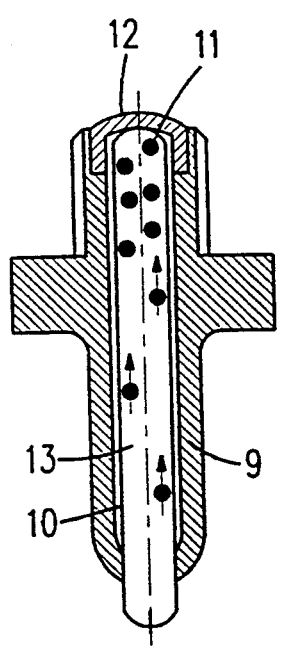

Solid balls 11 of conspicuous color are introduced into the indicator substance 13. Their specific weight is less than that of the indicator substance and, when the indicator device is mounted as shown in FIG. 1, said solid balls move in an upward direction as shown in FIG. 2. If the cold-storage cartridge is rotated through 180°, the indicator device assumes the position shown in FIG. 3. When the cold-storage medium 13 is fully charged, the balls 11 in the crystallized indicator substance 13 are in the position shown in FIG. 2. Otherwise, they move in an upward direction, as shown in FIG. 3, towards the transparent sealing cap 12, so that the user can see that the charging process has not yet been completed.

If the specific weight of the balls 11 is selected to be higher than the specific weight of the indicator substance, the balls 11 will move in the opposite direction.

We claim:

1. A cold-storage cartridge comprising a housing (1,2) having an interior into which a cold-storage medium (4) is introduced and having a device for indicating the charging state of the cold-storage medium, wherein the indicator device comprises an indicator substance (13) whose melting temperature Ti is lower than the melting temperature Ts of the cold-storage medium (4), the indicator substance (13) is held in a container (10) which is in heat-conducting contact with the cold-storage medium (4), the container (10) comprises an optically transparent wall portion (8) and the indicator device is connected to the cold-storage cartridge in such a manner that the transparent wall portion (8) is visible from outside the cold-storage cartridge.

2. A cold-storage cartridge as claimed in claim 1, wherein colored solid bodies (11) are introduced into the container (10) whose specific weight differs from that of the liquefied indicator substance (13).

3. A cold-storage cartridge as claimed in claim 1 wherein the melting temperature Ti of the indicator substance (13) is about 1 to 5K lower than the melting temperature Ts of the cold-storage medium (4).

4. A cold-storage cartridge as claimed in claim 1 wherein the container (10) of the indicator device projects into the area of the cold-storage medium (4) which is the last to crystallize during the cold-storage process.

5. A cold-storage cartridge as claimed in claim 1 wherein the indicator substance (13) is a eutectic aqueous mixture of an inorganic salt.

6. A cold-storage cartridge as claimed in claim 5, wherein cold-storage medium (4) is a mixture of potassium chloride, glycerine and water having a melting point of approximately −12° C., and in that the indicator substance (13) is a solution of 36.8% potassium hydrogenphosphate ($K_2HPO_4$) in water.

7. A cold-storage cartridge as claimed in claim 1 wherein the container (10) is made from a synthetic resin which is elastically expandable at the operating temperature.

8. A cold-storage cartridge as claimed in claim 1 wherein a protective housing (9) accommodates the container (10) so as to be in heat-conducting contact therewith, and in that said protective housing (9) projects into the cold-storage medium (4) via an aperture in the bottom of the cold-storage cartridge.

9. A cold-storage cartridge as claimed in claim 1 wherein an aperture which is formed in a wall (1,2) of the housing and into which the indicator device is introduced is a filling hole for the cold-storage medium.

10. A cold storage cartridge as claimed in claim 2 wherein the melting temperature Ti of the indicator substance (13) is 1 to 5K lower than the melting temperature Ts of the cold-storage medium (4).

11. A cold storage cartridge as claimed in claim 2 wherein the container (10) of the indicator device projects into the area of the cold-storage medium (4) which is the last to crystallize during the cold-storage process.

12. A cold storage cartridge as claimed in claim 3 wherein the container (10) of the indicator device projects into the area of the cold-storage medium (4) which is the last to crystallize during the cold-storage process.

13. A cold-storage cartridge as claimed in claim 2, wherein the indicator substance (13) is a eutectic aqueous mixture of an inorganic salt.

14. A cold-storage cartridge as claimed in claim 3, wherein the indicator substance (13) is a eutectic aqueous mixture of an inorganic salt.

15. A cold-storage cartridge as claimed in claim 4, wherein the indicator substance (13) is a eutectic aqueous mixture of an inorganic salt.

16. A cold-storage cartridge as claimed in claim 2 wherein the container (10) is made from a synthetic resin which is elastically expandable at the operating temperature.

17. A cold-storage cartridge as claimed in claim 3 wherein the container (10) is made from a synthetic resin which is elastically expandable at the operating temperature.

18. A cold-storage cartridge as claimed in claim 4 wherein the container (10) is made from a synthetic resin which is elastically expandable at the operating temperature.

19. A cold-storage cartridge as claimed in claim 5 wherein the container (10) is made from a synthetic resin which is elastically expandable at the operating temperature.

20. A cold-storage cartridge as claimed in claim 6 wherein the container (10) is made from a synthetic resin which is elastically expandable at the operating temperature.

21. A cold-storage cartridge as claimed in claim 2 wherein a protective housing (9) accommodates the container (10) so as to be in heat-conducting contact therewith, and said protective housing (9) projects into the cold-storage medium (4) via an 22. A cold-storage cartridge as claimed in claim 3 wherein a protective housing (9) accommodates the container (10) so as to be in heat-conducting contact therewith, and said protective housing (9) projects into the cold-storage medium (4) via an aperture in the bottom of the cold-storage cartridge.

23. A cold-storage cartridge as claimed in claim 4 wherein a protective housing (9) accommodates the container (10) so as to be in heat-conducting contact therewith, and said protective housing (9) projects into the cold-storage medium (4) via an aperture in the bottom of the cold-storage cartridge.

24. A cold-storage cartridge as claimed in claim 5 wherein a protective housing (9) accommodates the container (10) so as to be in heat-conducting contact therewith, and said protective housing (9) projects into the cold-storage medium (4) via an aperture in the bottom of the cold-storage cartridge.

25. A cold-storage cartridge as claimed in claim 6 wherein a protective housing (9) accommodates the container (10) so as to be in heat-conducting contact therewith, and said protective housing (9) projects into the cold-storage medium (4) via an aperture in the bottom of the cold-storage cartridge.

26. A cold-storage cartridge as claimed in claim 7 wherein a protective housing (9) accommodates the container (10) so as to be in heat-conducting contact therewith, and said protective housing (9) projects into the cold-storage medium (4) via an aperture in the bottom of the cold-storage cartridge.

27. A cold-storage cartridge as claimed in claim 2 wherein an aperture which is formed in a wall (1,2) of the housing and into which the indicator device is introduced is a filling hole for the cold-storage medium.

28. A cold-storage cartridge as claimed in claim 3 wherein an aperture which is formed in a wall (1,2) of the housing and into which the indicator device is introduced is a filling hole for the cold-storage medium.

29. A cold-storage cartridge as claimed in claim 4 wherein an aperture which is formed in a wall (1,2) of the housing and into which the indicator device is introduced is a filling hole for the cold-storage medium.

30. A cold-storage cartridge as claimed in claim 5 wherein an aperture which is formed in a wall (1,2) of the housing and into which the indicator device is introduced is a filling hole for the cold-storage medium.

31. A cold-storage cartridge as claimed in claim 6 wherein an aperture which is formed in a wall (1,2) of the housing and into which the indicator device is introduced is a filling hole for the cold-storage medium.

32. A cold-storage cartridge as claimed in claim 7 wherein an aperture which is formed in a wall (1,2) of the housing and into which the indicator device is introduced is a filling hole for the cold-storage medium.

33. A cold-storage cartridge as claimed in claim 8 wherein an aperture which is formed in a wall (1,2) of the housing and into which the indicator device is introduced is a filling hole for the cold-storage medium.

* * * * *